(12) United States Patent
Nakamura et al.

(10) Patent No.: US 7,087,857 B2
(45) Date of Patent: Aug. 8, 2006

(54) METHOD OF DIVIDING A WORKPIECE IN THE FORM OF A PLATE HAVING A LAYER AND A SUBSTRATE MADE OF DIFFERENT MATERIALS

(75) Inventors: Masaru Nakamura, Tokyo (JP); Toshiyuki Yoshikawa, Tokyo (JP); Satoshi Genda, Tokyo (JP)

(73) Assignee: Disco Corporation, Tokyo (JP)

( * ) Notice: Subject to any disclaimer, the term of this patent is extended or adjusted under 35 U.S.C. 154(b) by 2 days.

(21) Appl. No.: 10/914,152

(22) Filed: Aug. 10, 2004

(65) Prior Publication Data

US 2005/0035099 A1    Feb. 17, 2005

(30) Foreign Application Priority Data

Aug. 12, 2003    (JP) .............................. 2003-292188

(51) Int. Cl.
*B23K 26/38*    (2006.01)
*H01L 21/301*    (2006.01)

(52) U.S. Cl. .................. 219/121.72; 438/463

(58) Field of Classification Search ........... 219/121.72, 219/121.69; 438/460, 462, 463
See application file for complete search history.

(56) References Cited

U.S. PATENT DOCUMENTS

| | | | |
|---|---|---|---|
| 6,300,224 B1 * | 10/2001 | Arima et al. | 438/462 |
| 2002/0048906 A1 * | 4/2002 | Sakai et al. | 438/464 |
| 2005/0035100 A1 * | 2/2005 | Genda | 219/121.72 |

FOREIGN PATENT DOCUMENTS

| | | | |
|---|---|---|---|
| JP | 3-64043 A | * | 3/1991 |
| JP | 2003-320466 | | 11/2003 |

* cited by examiner

*Primary Examiner*—Geoffrey S. Evans
(74) *Attorney, Agent, or Firm*—Smith, Gambrell & Russell, LLP

(57) ABSTRACT

A method of dividing a plate-like workpiece having a layer that is made of a different material from that of a substrate and is formed on the front surface of the substrate along predetermined dividing lines, comprising a laser beam application step for applying a laser beam to each dividing line formed on the plate-like workpiece except for a non-processed area in at least one end portion thereof to form grooves deeper than the layer; and a cutting step for cutting the plate-like workpiece along each dividing line by positioning a cutting blade on the side of the non-processed area in the dividing line where the grooves have been formed in the laser beam application step and moving the plate-like workpiece relative to the cutting blade while rotating the cutting blade.

2 Claims, 6 Drawing Sheets

(a)

(b)

(a)

(b)

(a)

(b)

METHOD OF DIVIDING A WORKPIECE IN THE FORM OF A PLATE HAVING A LAYER AND A SUBSTRATE MADE OF DIFFERENT MATERIALS

FIELD OF THE INVENTION

The present invention relates to a method of dividing a plate-like workpiece such as a semiconductor wafer or the like. More specifically, it relates to a method of dividing a plate-like workpiece having a layer that is made of a material different from that of a substrate and is formed on the front surface of the substrate, along predetermined dividing lines.

DESCRIPTION OF THE PRIOR ART

As is known to people of ordinary skill in the art, in the production process of semiconductor devices, individual semiconductor chips are manufactured by forming a circuit such as IC or LSI in each of a plurality of areas sectioned by dividing lines called "streets" formed in a lattice pattern on the front surface of a substantially disk-like semiconductor wafer and cutting the semiconductor wafer along the dividing lines to divide it into the circuit-formed areas. Cutting along the dividing lines of the semiconductor wafer is generally carried out by a cutting machine called "dicer". This cutting machine comprises a chuck table for holding a semiconductor wafer as a workpiece, a cutting means for cutting the semiconductor wafer held on the chuck table, and a moving means for moving the chuck table and the cutting means relative to each other. The cutting means comprises a rotary spindle which is caused to rotate at a high speed and a cutting blade mounted to the spindle. The cutting blade comprises a disk-like base and an annular edge that is mounted to the outer peripheral portion of side wall of the base and formed as thick as about 20 to 40 μm by fixing diamond abrasive grains having a diameter of about 3 μm onto the base by electroforming.

To improve the throughput of a circuit such as IC or LSI, a semiconductor wafer having a low-dielectric insulating film (Low-k film) composed of a film of an inorganic material such as SiOF or BSG (SiOB) or a film of an organic material such as a polymer exemplified by polyimide or parylene laminated on the front surface of a semiconductor substrate such as a silicon wafer has recently been implemented. Further, a semiconductor wafer having a metal pattern called "test element group (Teg)" which is formed on dividing lines to check circuits before the semiconductor wafer is divided into individual semiconductor chips has also been implemented.

As the Low-k film consists of multi-layers (5 to 15 layers) like mica and is extremely fragile, when the semiconductor wafer having the above Low-k film laminated thereon is cut along a dividing line with a cutting blade, a problem occurs that the Low-k film peels off, and this peeling reaches a circuit and gives a fatal damage to a semiconductor chip. Further, when the semiconductor wafer having a metal pattern called "Teg" is cut along a dividing line with a cutting blade, a problem occurs that a burr is formed because the metal pattern is made of a sticky metal such as copper.

To solve the above problems, a dividing method for applying a laser beam to a semiconductor wafer along the dividing lines thereof to remove the Low-k film or Teg and then, positioning a cutting blade to the area from which the Low-k film or Teg has been removed, to cut the semiconductor wafer is undertaken. In this connection, a processing machine for carrying out the above dividing method is disclosed in JP-A 2003-320466.

In the above dividing method, as shown in FIG. 8, a laser beam is applied to a semiconductor wafer W along a dividing line S to form two grooves G and G deeper than the layer of the Low-k film L. As a result, the Low-k film L on the dividing line S is divided off by the two grooves G and G. In this case, the space between the two grooves G and G is set to a width larger than the thickness of the cutting blade. Therefore, when the space between the two grooves G and G is cut with the cutting blade, the Low-k film remaining in the space between the two grooves G and G is cut with the cutting blade but does not affect the circuit even if it is peeled off because the remaining Low-k film is divided off at both sides. To remove all the Low-k film in the areas to be cut with the cutting blade, attempts are being made to form three or more grooves by applying a laser beam.

When the cutting blade B is positioned between the two grooves G and G as shown in FIG. 9 to cut the semiconductor wafer W having, for example, two grooves G and G formed therein along the dividing lines S to divide it into individual semiconductor chips as described above, the cutting blade B is curved due to the grooves G and G. The curvature of the cutting blade B appears also in the case where three or more grooves are formed. As a result, the cut grooves expand and give damages to the semiconductor chips.

SUMMARY OF THE INVENTION

It is an object of the present invention to provide a method of dividing a plate-like workpiece having a layer that is made of a different material from that of a substrate and is formed on the front surface of the substrate, comprising applying a laser beam to the plate-like workpiece along predetermined dividing lines to form grooves deeper than the layer and then, cutting the plate-like workpiece along the dividing lines with a cutting blade, wherein the plate-like workpiece can be cut without having the curvature of the cutting blade.

To attain the above object, according to the present invention, there is provided a method of dividing a plate-like workpiece having a layer that is made of a different material from that of a substrate and is formed on the front surface of the substrate along predetermined dividing lines, which comprises:

a laser beam application step for applying a laser beam to each dividing line formed on the plate-like work piece except for a non-processed area in at least one end portion thereof to form grooves deeper than the layer; and a cutting step for cutting the plate-like workpiece along each dividing line by positioning a cutting blade on the side of the non-processed area in the dividing line where the grooves have been formed in the laser beam application step and then, moving the plate-like workpiece relative to the cutting blade while rotating the cutting blade.

The non-processed area left behind in the dividing line in the above laser beam application step is set to a width of 0.3 to 3 mm. A plurality of grooves are formed along the same dividing line in the laser beam application step, and the length between the outer sides of the grooves on both sides is set to be larger than the thickness of the cutting blade.

According to the present invention, since the non-processed area is left behind in at least one end portion of each dividing line and grooves are not formed in this area in the laser beam application step, the cutting blade can carry out stable cutting in the cutting step and does not curve. Since the cutting blade does not curve at the start of cutting, even when the grooves are formed in each dividing line, the cutting blade is kept upright and can cut extremely accurately without the expansion of the grooves.

DETAILED DESCRIPTION OF THE PREFERRED EMBODIMENTS

The method of dividing a plate-like workpiece according to the present invention will be described in more detail hereinafter with reference to the accompanying drawings.

Figure 1:
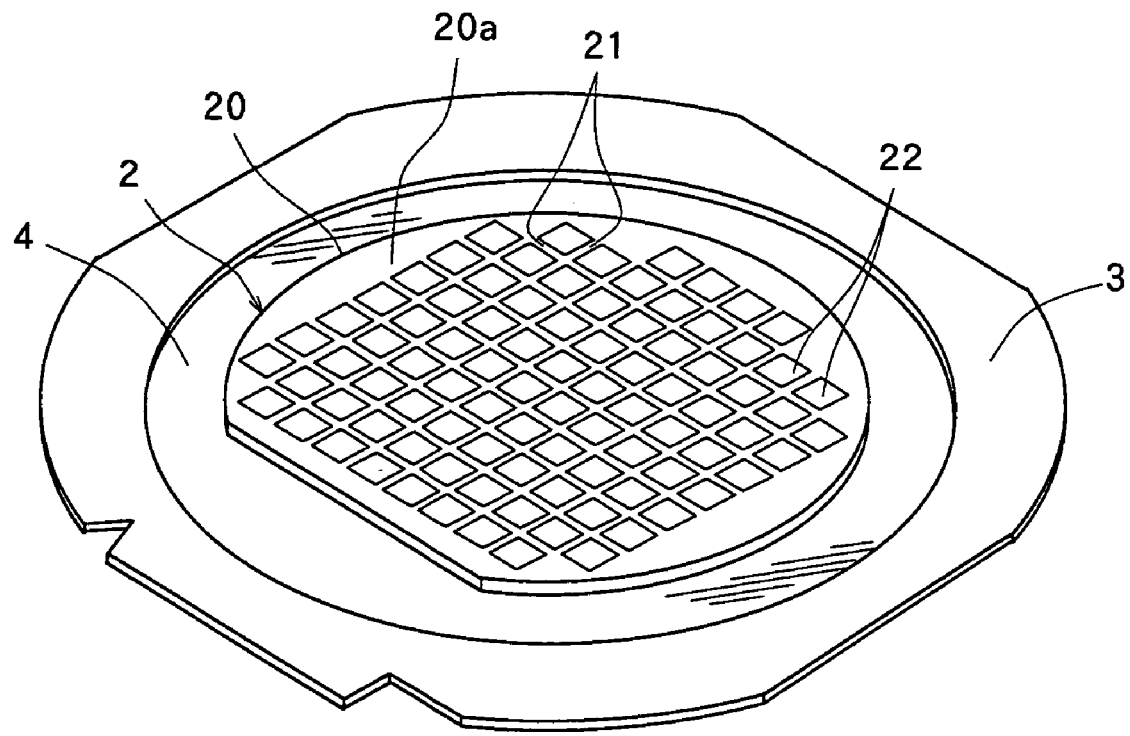
FIG. 1 is a perspective view of a semiconductor wafer as a plate-like workpiece, which is supported to a frame by a protective tape, to be divided by the present invention.
Figure 2:
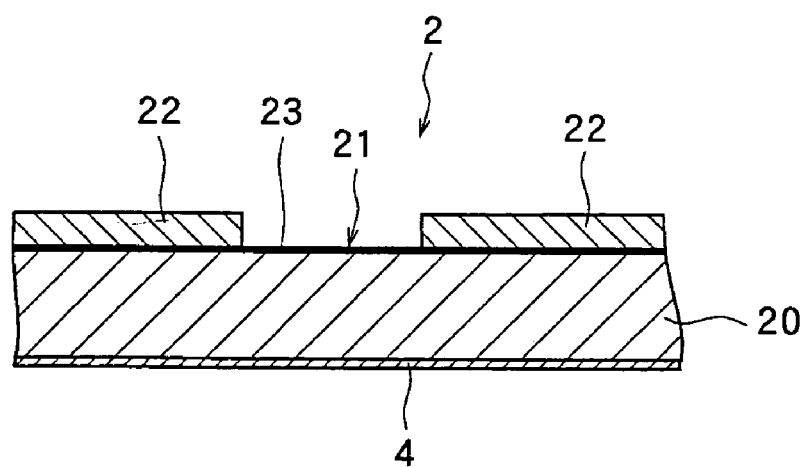
FIG. 2 is an enlarged sectional view of the semiconductor wafer shown in FIG. 1.
Figure 3:
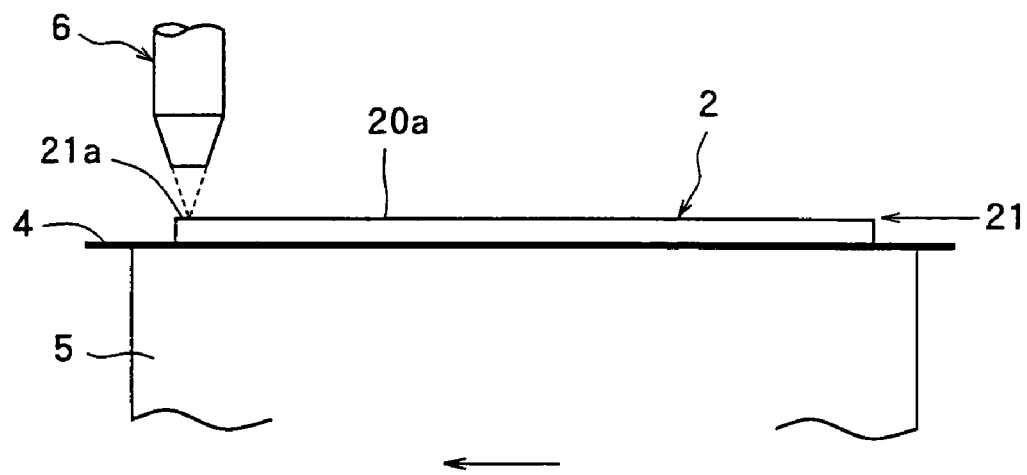
FIGS. 3(a) and 3(b) are explanatory diagrams showing the laser beam application step in the method of dividing a plate-like workpiece according to the present invention.
Figure 3:
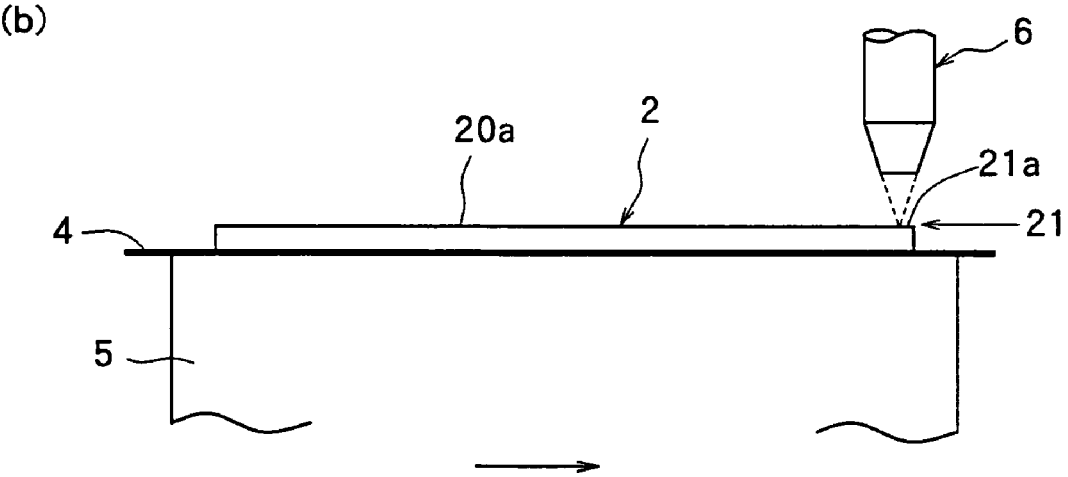

FIG. 1 is a perspective view of a semiconductor wafer as a plate-like workpiece to be divided according to the present invention. In the semiconductor wafer 2 shown in FIG. 1, a plurality of dividing lines 21 are formed in a lattice pattern on the front surface 20a of a substrate 20 which is a silicon wafer, and a circuit 22 is formed in each of a plurality of areas sectioned by the plurality of dividing lines 21. In the illustrated embodiment, as shown in FIG. 2, a low-dielectric insulating film (Low-k film) 23 composed of a film of an inorganic material such as SiOF or BSG (SiOB) or a film of an organic material such as a polymer exemplified by polyimide or parylene is laminated on the front surface 20a of the substrate 20, and the circuits 22 are formed on the front surface of the Low-k film 23. The back surface of the semiconductor wafer 2 thus formed is put to a protective tape 4 affixed to an annular frame 3 as shown in FIG. 1 so that when it is divided into individual semiconductor chips, the semiconductor chips do not fall apart.

The method of manufacturing semiconductor chips by dividing the above semiconductor wafer 2 into individual semiconductor chips will be described with reference to FIGS. 3 to 7.

In the method of dividing a plate-like workpiece according to the present invention, the laser beam application step for applying a laser beam along the dividing lines 21 formed on the semiconductor wafer 2 to form grooves deeper than the layer of the Low-k film, in the dividing lines 21 is first carried out. That is, as shown in FIGS. 3(a) and 3(b), the semiconductor wafer 2 is placed on the chuck table 5 of a laser beam processing machine in such a manner that its front surface 20a faces up and held on the chuck table 5 by a suction means that is not shown. Thereafter, the chuck table 5 holding the semiconductor wafer 2 is moved to a laser beam processing start position of a laser beam processing area. At this moment, as shown in FIG. 3(a), the semiconductor wafer 2 is positioned such that the application position of laser beam application means 6 is located at a position 0.3 to 3.0 mm on the inner side (right side in FIG. 3(a)) from one end (left end in FIG. 3(a)) of the dividing line 21.

After the chuck table 5, that is, the semiconductor wafer 2 is positioned to the laser beam processing start position of the laser beam processing area, the chuck table 5, that is, the semiconductor wafer 2 is moved in a direction indicated by an arrow in FIG. 3(a) at a predetermined feed rate while a pulse laser beam is applied from the laser beam application means 6. When the application position of the laser beam application means 6 reaches a position 0.3 to 3.0 mm on the inner side (left side in FIG. 3(b)) from the other end (right end in FIG. 3(b)) of the dividing line 21 as shown in FIG. 3(b), the application of the pulse laser beam is stopped and the movement of the chuck table 5, that is, the semiconductor wafer 2 is also stopped.

Then, the chuck table 5, that is, the semiconductor wafer 2 is moved about 40 μm in a direction perpendicular to the sheet (index-feeding direction). The chuck table 5, that is, the semiconductor wafer 2 is moved in a direction indicated by an arrow in FIG. 3(b) at a predetermined feed rate while a pulse laser beam is applied from the laser beam application means 6. When the application position of the laser beam application means 6 reaches the position shown in FIG. 3(a), the application of the pulse laser beam is stopped and the movement of the chuck table 5, that is, the semiconductor wafer 2 is also stopped.

The laser beam application step is carried out under the following processing conditions.

Light source: YVO4 laser or YAG laser
Wavelength: 355 nm
Output: 4 to 10 W
Repetition frequency: 10 to 100 kHz
Pulse width: 10 to 50 ns
Focusing spot diameter: 10 to 50 μm
Processing-feed rate: 100 to 300 mm/sec.

Figure 4:
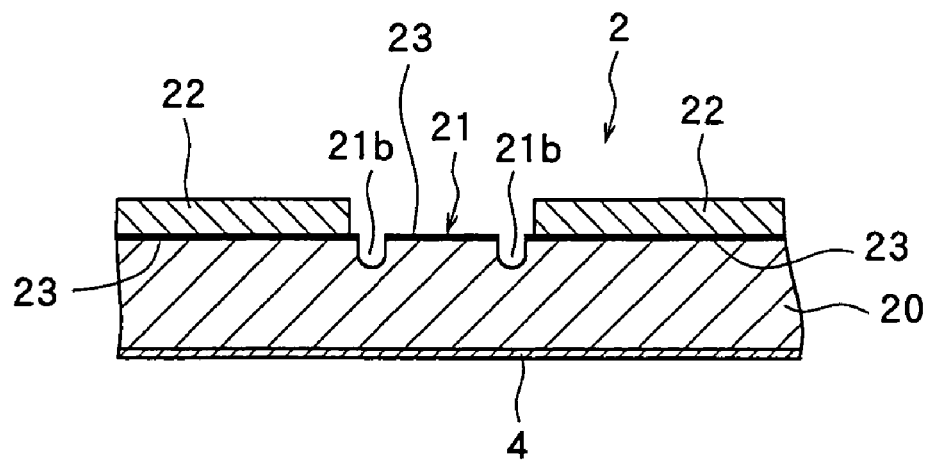
FIG. 4 is an enlarged sectional view of the plate-like work piece that has been subjected to the laser beam application step in the method of dividing a plate-like workpiece according to the present invention.

By carrying out the above laser beam application step, two grooves 21b and 21b deeper than the layer of the Low-k film 23 are formed in the dividing line 21 of the semiconductor wafer 2 except for non-processed areas 21a (FIGS. 3(a) and 3(b)) in both end portions thereof, as shown in FIG. 4. As a result, the Low-k film 23 is divided off by the two grooves 21b and 21b. Since in the laser beam application step, a laser beam is applied to the dividing line 21 except for the non-processed areas 21a in both end portions thereof as described above, the semiconductor wafer 2 can be carried to the next step without the protective tape 4 being damaged by the laser beam. At this time, the length between the outer sides of the two grooves 21b and 21b formed in the dividing line 21 is set to be larger than the thickness of the cutting blade which will be described later.

Figure 5:
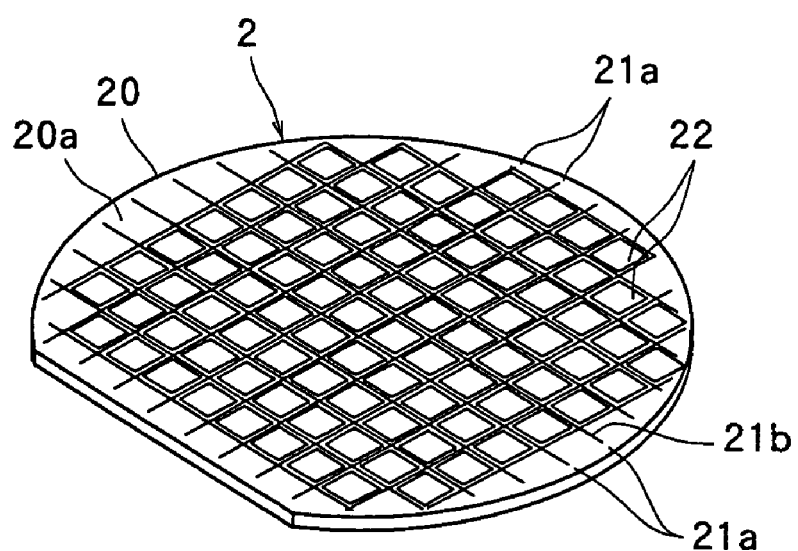
FIG. 5 is a perspective view of the semiconductor wafer shown in FIG. 1, which has been subjected to the laser beam application step.
Figure 6:
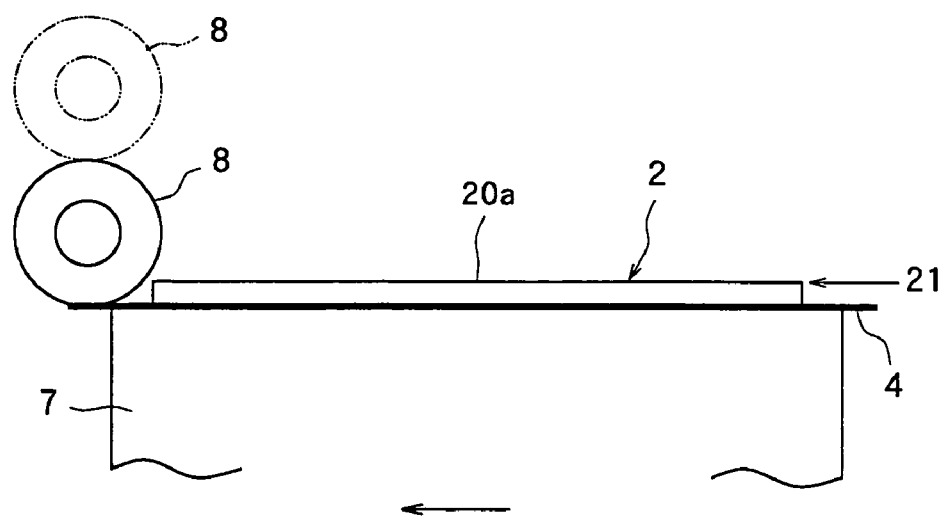
FIGS. 6(a) and 6(b) are explanatory diagrams showing the cutting step in the method of dividing a plate-like workpiece according to the present invention.
Figure 6:
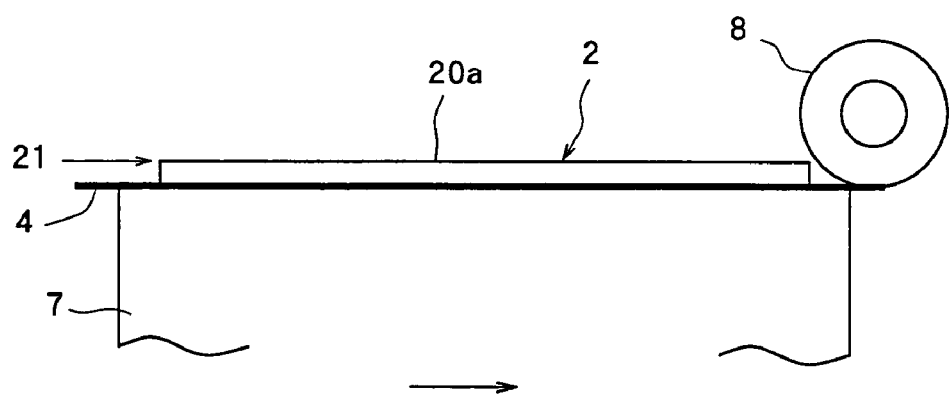
Figure 7:
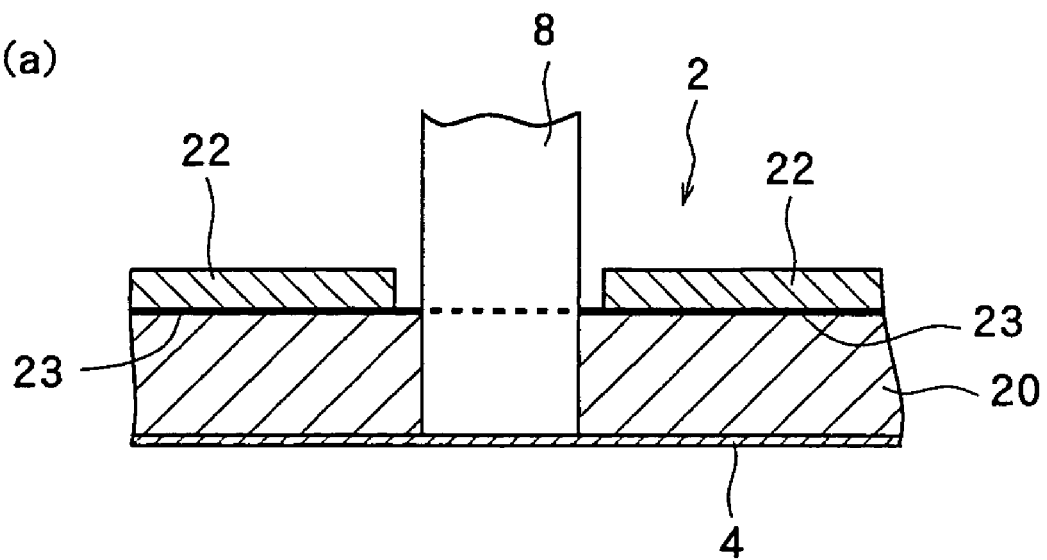
FIGS. 7(a) and 7(b) are explanatory diagrams showing the state of a cutting blade in the cutting step in the dividing method of the present invention.
Figure 7:
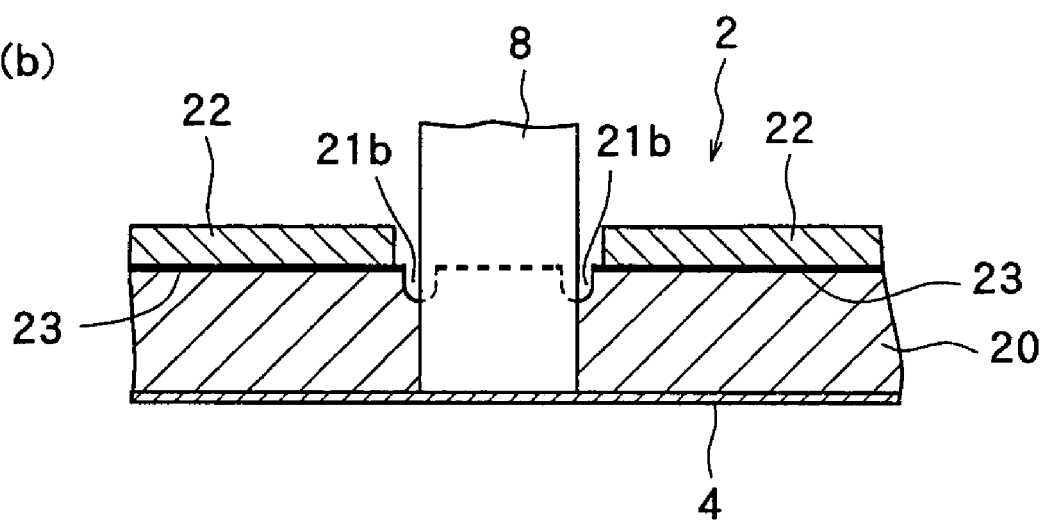
Figure 8:
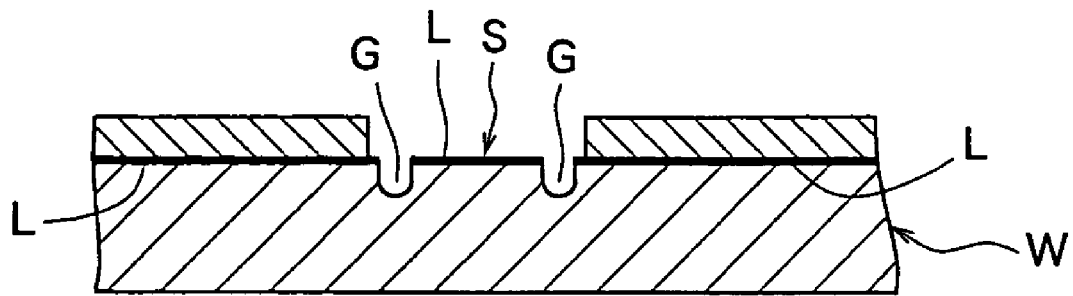
FIG. 8 is an enlarged sectional view showing the state of a plate-like workpiece to which a laser beam has been applied along a dividing line by the method of the prior art.
Figure 9:
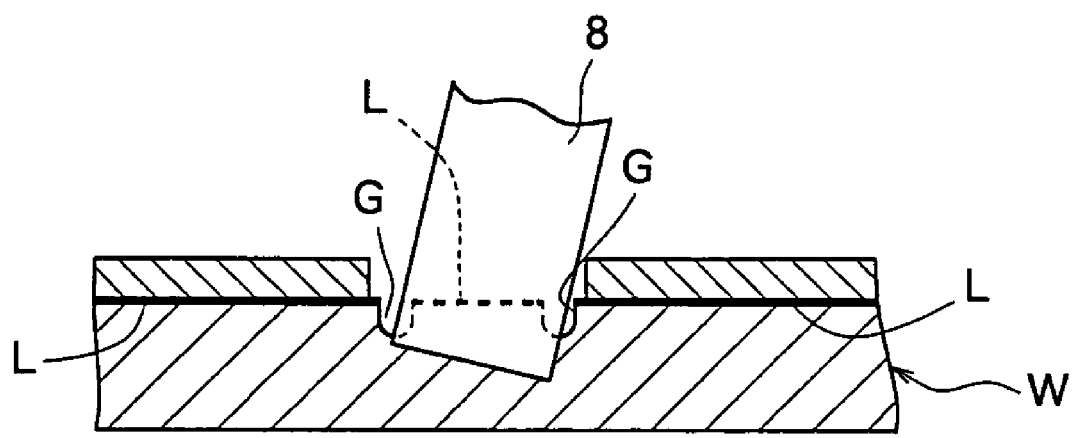
FIG. 9 is an enlarged sectional view showing the state of the plate-like workpiece shown in FIG. 8, cut with a cutting blade along the dividing line formed thereon.

The above laser beam application step is carried out on all the dividing lines formed on the semiconductor wafer 2. As a result, the grooves 21b are formed in the semiconductor wafer 2 along the dividing lines while the non-processed areas 21a are left behind in the outer peripheral portion of the semiconductor wafer 2, as shown in FIG. 5.

After the above laser beam application step is carried out on all the dividing lines 21 formed on the semiconductor wafer 2, the cutting step for cutting along the dividing lines 21 is carried out. That is, as shown in FIGS. 6(a) and 6(b), the semiconductor wafer 2 which has been subjected to the laser beam application step is placed on the chuck table 7 of a cutting machine in such a manner that its front surface 20a faces up and held on the chuck table 7 by a suction means that is not shown. Thereafter, the chuck table 7 holding the semiconductor wafer 2 is moved to the cutting start position of a cutting area. At this moment, as shown in FIG. 6(a), the semiconductor wafer 2 is positioned such that one end (left end in FIG. 6(a)) of the dividing line 21 to be cut is situated on the right side by a predetermined amount from a position right below the cutting blade 8.

After the chuck table 7, that is, the semiconductor wafer 2 is thus positioned to the cutting start position of the cutting area, the cutting blade 8 is moved down from a standby position shown by a two-dot chain line in FIG. 6(a) to be positioned to a predetermined cut-feeding position shown by a solid line in FIG. 6(a). This cut-feeding position is set to a position where the lower end of the cutting blade 8 reaches the protective tape 4 affixed to the back surface of the semiconductor wafer 2.

Then, the cutting blade 8 is rotated at a predetermined revolution, and the chuck table 7, that is, the semiconductor wafer 2 is moved in a direction indicated by an arrow in FIG. 6(a) at a predetermined cut-feeding rate. When the cut-feeding is started thus, the cutting blade 8 starts cutting from one end (left end in FIGS. 6(a) and 6(b)) of the dividing line 21. Since one end portion of the dividing line 21 is the non-processed area 21a and hence, the above grooves 21b and 21b are not formed in the area 21a, the cutting blade 8 can carry out stable cutting and does not cause curvature, as shown in FIG. 7(a). The Low-k film 23 remains in the non-processed area 21a and even though it may peel off when it is cut with the cutting blade 8, the non-processed area 21a having no circuits formed therein does not affect the circuit 22.

After the cut-feeding is started as described above and the chuck table 7, that is, the semiconductor wafer 2 is moved until the other end (right end in FIGS. 6(a) and 6(b)) of the dividing line 21 reaches a position on the left side by a predetermined amount from a position right below the cutting blade 8, as shown in FIG. 6(b), the movement of the chuck table 7, that is, the semiconductor wafer 2 is stopped. The semiconductor wafer 2 is cut along the dividing line 21 by cut-feeding the chuck table 7, that is, the semiconductor wafer 2 as described above. Since the cutting blade 8 does not curve at the start of cutting, even when the grooves 21b and 21b are formed in the dividing line 21, the cutting blade 8 is kept upright and can cut extremely accurately without the expansion of the grooves, as shown in FIG. 7(b). When the space between the two grooves 21b and 21b is cut with the cutting blade 8 as described above, the Low-k film 23 remaining between the two grooves 21b and 21b is cut with the cutting blade 8 but even when it peels off, does not affect the circuit 22 because the film is divided off by the two grooves 21b and 21b at both sides.

Thereafter, the chuck table 7, that is, the semiconductor wafer 2 is index-fed by a predetermined amount corresponding to the interval between the dividing lines 21 in a direction perpendicular to the sheet (index-feeding direction), and the dividing line 21 to be cut next is aligned with the cutting blade 8. The chuck table 7, that is, the semiconductor wafer 2 is moved in the direction shown by the arrow in FIG. 6(b) at a predetermined cut-feeding rate and cut from the other end (right end in FIGS. 6(a) and 6(b)) of the dividing line 21. When the cutting blade 8 reaches the position shown in FIG. 6(a), the movement of the chuck table 5, that is, the semiconductor wafer 2 is stopped. When the semiconductor wafer 2 is cut from the other end of the dividing line 21, too, the non-processed area 21a is formed in the other end portion of the dividing line 21 and the grooves 21b and 21b are not formed in the non-processed area 21a. Therefore, the cutting blade 8 can carry out stable cutting and does not curve, as described above.

The above cutting step is carried out under the following processing conditions, for example.

Cutting blade: outer diameter of 52 mm and thickness of 40 μm

Revolution of cutting blade: 40,000 rpm

Cut-feeding rate: 50 mm/sec.

The above cutting step is carried out on all the dividing lines 21 formed on the semiconductor wafer 2. As a result, the semiconductor wafer 2 is cut along the dividing lines 21 to be divided into individual semiconductor chips.

In the above embodiment, a laser beam is applied to dividing line 21 except for the non-processed areas 21a in both end portions thereof in the laser beam application step. In the case when the subsequent cutting step is carried out from only one end portion of the dividing line 21, a laser beam may be applied except for the non-processed area 21a only in the one end portion of the dividing line 21 at which the cutting blade 8 is positioned to the corresponding position and starts cutting. In the above embodiment, two grooves 21b and 21b are formed. One groove wider than the thickness of the cutting blade 8, or three or more grooves may be formed to remove all the Low-k film L in the cutting area with the cutting blade 8.

We claim:

1. A method of dividing a workpiece in the form of a plate, the workpiece having a layer that is made of a different material from that of a substrate and is formed on the front surface of the substrate along predetermined dividing lines, comprising:

a laser beam application step for applying a laser beam to each dividing line formed on the workpiece except for a non-processed area in at least one end portion thereof to form grooves deeper than the layer, wherein the non-processed area left behind in each dividing line in the laser beam application step is set to a width of 0.3 to 3 mm; and a cutting step for cutting the workpiece along each dividing line by positioning a cutting blade on the side of the non-processed area in the dividing line where the grooves have been formed in the laser beam application step and moving the workpiece relative to the cutting blade while rotating the cutting blade.

2. The method of dividing a workpiece in the form of a plate according to claim 1, wherein a plurality of grooves are formed along the same dividing line in the laser beam application step, and the length between the outer sides of the grooves on both sides is set to be larger than the thickness of the cutting blade.

* * * * *